(12) United States Patent
Liu

(10) Patent No.: US 10,680,985 B2
(45) Date of Patent: Jun. 9, 2020

(54) SYSTEMS AND METHODS FOR RANKING CONTENT

(71) Applicant: Facebook, Inc., Menlo Park, CA (US)

(72) Inventor: Weiyi Liu, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 85 days.

(21) Appl. No.: 15/376,508

(22) Filed: Dec. 12, 2016

(65) Prior Publication Data

US 2018/0167348 A1 Jun. 14, 2018

(51) Int. Cl.
*G06F 15/16* (2006.01)
*H04L 12/58* (2006.01)
*H04L 29/08* (2006.01)

(52) U.S. Cl.
CPC .............. *H04L 51/12* (2013.01); *H04L 51/32* (2013.01); *H04L 67/22* (2013.01)

(58) Field of Classification Search
CPC .......... H04L 51/12; H04L 51/32; H04L 67/22
USPC .......................... 709/204, 205, 206, 238, 240
See application file for complete search history.

(56) References Cited

U.S. PATENT DOCUMENTS

| | | | |
|---|---|---|---|
| 9,183,259 B1 | 11/2015 | Marra | |
| 9,436,764 B2 | 9/2016 | Ray et al. | |
| 9,854,317 B1 | 12/2017 | Abboa-Offei | |
| 10,261,672 B1 | 4/2019 | Dolbakian et al. | |
| 2004/0040039 A1* | 2/2004 | Bernier | H04N 5/44543 725/46 |
| 2008/0075058 A1* | 3/2008 | Mundarath | H04B 7/043 370/342 |
| 2009/0327915 A1 | 12/2009 | Holdaway et al. | |
| 2010/0325205 A1* | 12/2010 | Murphy | G06Q 10/10 709/204 |
| 2011/0119595 A1* | 5/2011 | Bydeley | H04N 21/44213 715/738 |
| 2011/0214146 A1* | 9/2011 | Hong | H04N 5/44543 725/46 |
| 2011/0246440 A1* | 10/2011 | Kocks | G06F 17/30781 707/706 |
| 2011/0289139 A1* | 11/2011 | McIntosh | H04N 21/252 709/203 |
| 2011/0289433 A1* | 11/2011 | Whalin | G06F 17/30964 715/753 |
| 2013/0311408 A1 | 11/2013 | Bagga | |
| 2014/0156746 A1* | 6/2014 | Wheatley | H04L 67/22 709/204 |
| 2014/0181857 A1* | 6/2014 | Lee | H04N 21/42204 725/25 |
| 2014/0237426 A1 | 8/2014 | Terazono et al. | |
| 2015/0116230 A1 | 4/2015 | Hsiao | |

(Continued)

*Primary Examiner* — Liang Che A Wang
(74) *Attorney, Agent, or Firm* — Sheppard Mullin Richter & Hampton LLP

(57) ABSTRACT

Systems, methods, and non-transitory computer-readable media can provide an interface that includes a grid of content items, the grid also including at least a first slot through which a first content channel is accessible and a second slot through which a second content channel is accessible. A determination is made that the second content channel is ranked higher than the first content channel based at least in part on one or more measurements. The interface is updated so that the second content channel is presented in the first slot and the first content channel is presented in the second slot.

20 Claims, 9 Drawing Sheets

(56) References Cited

U.S. PATENT DOCUMENTS

| | | | |
|---|---|---|---|
| 2015/0149544 A1* | 5/2015 | Zhang | G06Q 10/109 |
| | | | 709/204 |
| 2015/0331583 A1* | 11/2015 | Zhang | G06F 3/04842 |
| | | | 715/825 |
| 2015/0332314 A1 | 11/2015 | Chakraborty | |
| 2016/0041833 A1* | 2/2016 | Standley | G06F 9/445 |
| | | | 718/100 |
| 2016/0275172 A1* | 9/2016 | Noma | G06Q 10/06 |
| 2017/0061515 A1 | 3/2017 | Hummel | |
| 2017/0072321 A1* | 3/2017 | Thompson | H04N 21/23424 |
| 2017/0105048 A1* | 4/2017 | Stein | H04N 21/4826 |
| 2017/0188214 A1 | 6/2017 | Liu | |
| 2017/0213243 A1 | 7/2017 | Dollard | |
| 2017/0316090 A1* | 11/2017 | Shin | G06F 16/686 |
| 2017/0329397 A1* | 11/2017 | Lin | G06F 3/013 |
| 2018/0075479 A1* | 3/2018 | DeGraide | G06Q 30/0251 |
| 2018/0096251 A1 | 4/2018 | Dinu | |
| 2018/0260081 A1 | 9/2018 | Beaudoin et al. | |

* cited by examiner

600

Determine that a set of content channels are available for presentation through a first slot in an interface
602

Determine a ranking for the set of content channels
604

Select a best ranking content channel from among the set of content channels
606

Provide the interface that includes a grid of content items, the grid also including at least the first slot through which the best ranking content channel is accessible
608

FIGURE 6

SYSTEMS AND METHODS FOR RANKING CONTENT

FIELD OF THE INVENTION

The present technology relates to the field of content provision. More particularly, the present technology relates to techniques for ranking content for users.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to provide an interface that includes a grid of content items, the grid also including at least a first slot through which a first content channel of a first type is accessible and a second slot through which a second content channel of a second type is accessible. A determination is made that the second content channel is ranked higher than the first content channel based at least in part on one or more measurements. The interface is updated so that the second content channel is presented in the first slot and the first content channel is presented in the second slot.

In some embodiments, the systems, methods, and non-transitory computer readable media are configured to determine that a user interacting with the interface has accessed content channels of the second type more often than content channels of the first type over some period of time.

In some embodiments, the user is determined to have accessed a content channel when the user selects the content channel through the interface or when the user spends a threshold amount of time accessing content items included in the content channel.

In some embodiments, the systems, methods, and non-transitory computer readable media are configured to determine that a group of users have accessed content channels of the second type more often than content channels of the first type over some period of time.

In some embodiments, the group of users is defined based in part on one or more shared demographics.

In some embodiments, the group of users are located in the same geographic region.

In some embodiments, a content channel is one of a personalized content channel, a trending event channel, a topic channel, or an editorial channel.

In some embodiments, the systems, methods, and non-transitory computer readable media are configured to determine that a set of content items included in one or more content channels of the second type received more user interactions than a set of content items included in one or more content channels of the first type.

In some embodiments, the systems, methods, and non-transitory computer readable media are configured to determine that an amount of time spent by a group of users viewing content items included in one or more content channels of the second type is greater than an amount of time spent by the group of users viewing content items included in one or more content channels of the first type.

In some embodiments, the systems, methods, and non-transitory computer readable media are configured to determine that a user interacting with the interface has dismissed one or more content channels of the first type over some period of time.

Various embodiments of the present disclosure can include systems, methods, and non-transitory computer readable media configured to determine that a set of content channels are available for presentation through a first slot in an interface, a ranking for the set of content channels is determined, a best ranking content channel is selected from among the set of content channels, and the interface that includes a grid of content items is provided. The grid also includes at least the first slot through which the best ranking content channel is accessible.

In some embodiments, the systems, methods, and non-transitory computer readable media are configured to determine that more content items included in a second content channel were posted by entities being followed by a user accessing the interface than in a first content channel and determine that the second content channel is ranked higher than the first content channel.

In some embodiments, the systems, methods, and non-transitory computer readable media are configured to determine that more content items included in a second content channel were posted by entities being followed by at least one friend of a user accessing the interface than in a first content channel and determine that the second content channel is ranked higher than the first content channel.

In some embodiments, the systems, methods, and non-transitory computer readable media are configured to determine that more content items included in a second content channel satisfy a threshold media quality than content items included in a first content channel and determine that the second content channel is ranked higher than the first content channel.

In some embodiments, the media quality is measured based at least in part on a video quality, an audio quality, or both.

In some embodiments, the systems, methods, and non-transitory computer readable media are configured to determine that a first content channel corresponds to a first event and a second content channel corresponds to a second event, determine that a user accessing the interface is located within a threshold geographic distance from the second event and not from the first event, and determine that the second content channel is ranked higher than the first content channel.

In some embodiments, the systems, methods, and non-transitory computer readable media are configured to determine that a first content channel corresponds to a first event and a second content channel corresponds to a second event, determine that a friend of a user accessing the interface is attending the second event, and determine that the second content channel is ranked higher than the first content channel.

In some embodiments, the systems, methods, and non-transitory computer readable media are configured to determine that more user interactions were received for content items included in a second content channel than for content items included in a first content channel and determine that the second content channel is ranked higher than the first content channel.

In some embodiments, a user interaction is determined based on a user liking a content item, sharing the content item, or posting a comment in response to the content item.

In some embodiments, the systems, methods, and non-transitory computer readable media are configured to determine that an amount of time spent by users viewing content items included in a second content channel is greater than an amount of time spent by users viewing content items included in a first content channel and determine that the second content channel is ranked higher than the first content channel.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 6 illustrates an example method for inter-channel ranking, according to an embodiment of the present disclosure.

Figure 1:
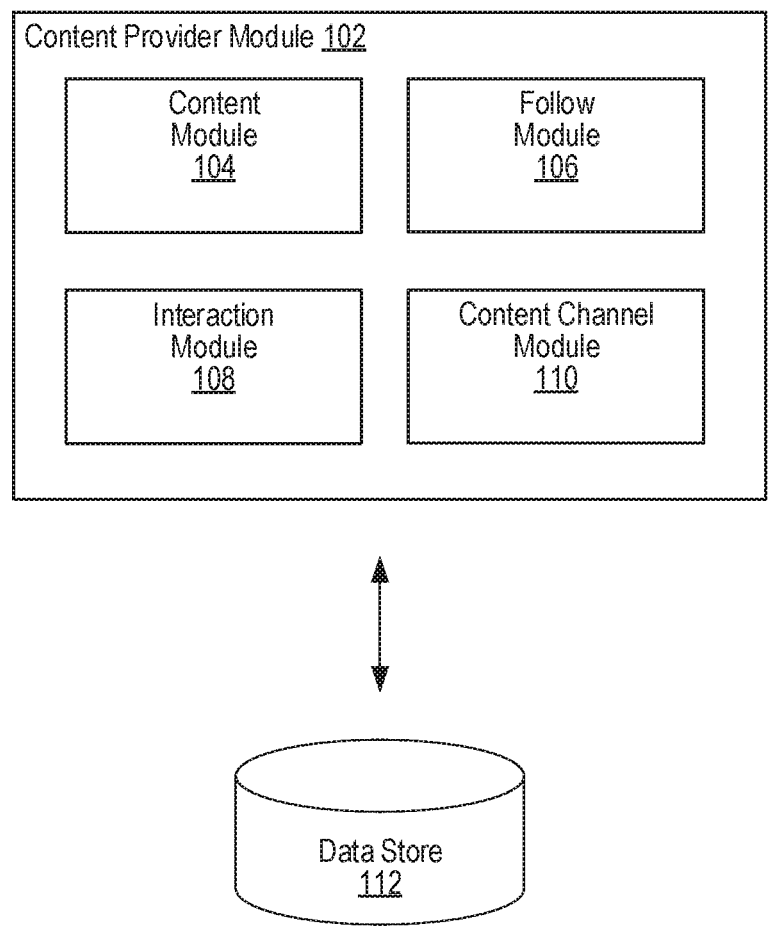
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Ranking Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" (or unsubscribing from) the first user.

Under conventional approaches, users can access various content items through the social networking system. Given the vast number of content items that may be made available through the social networking system, it can be difficult for the user to sift through the various content items to find content that is of interest. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users can access various types of content channels (or streams) through the social networking system. In general, a content channel can be composed of a number of individual content items and at least some of these content items may have been posted by various users of the social networking system. Such content channels can continually be updated to include newly posted content items that have been determined to be relevant to the channel. As a result, content channels can provide a continuous stream of relevant various content items that are available for the user to browse.

For example, in some embodiments, a user can access one or more personalized content channels which can include various types of content items that have been determined to be relevant, or of interest, to the user. In some embodiments, the user can access one or more trending event channels that each correspond to a particular event that is trending in popularity. Each trending event channel may include various types of content items that each have been determined to be relevant, or related, to that event. In some embodiments, the user can access one or more topic channels that each correspond to a particular topic (e.g., baking, motorcycles, funny, cats, etc.). Each topic channel may include various types of content items that each have been determined to be relevant, or related, to that topic. In some embodiments, the user can access one or more editorial channels that include curated content items. In some embodiments, the content items included in a given content channel can be ranked so that the best, or most relevant, content items are presented to the user before other content items included in the content channel. In some embodiments, the content channels can be ranked amongst themselves so that the best, or most relevant, content channels are presented to the user before other content channels.

FIG. 1 illustrates an example system 100 including an example content provider module 102, according to an embodiment of the present disclosure. As shown in the example of FIG. 1, the content provider module 102 can include a content module 104, a follow module 106, an interaction module 108, and a content channel module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 710 of FIG. 7. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 730 of FIG. 7.

The content provider module 102 can be configured to communicate and/or operate with the at least one data store 112, as shown in the example system 100. The at least one data store 112 can be configured to store and maintain various types of data. For example, the data store 112 can store information describing various content that has been posted by users of a social networking system. In some implementations, the at least one data store 112 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content provider module 102 can be configured to provide users with access to content that is posted through a social networking system. For example, the content module 104 can provide a first user with access to content items through an interface that is provided by a software application (e.g., a social networking application) running on a computing device of the first user. The first user can also interact with the interface to post content items to the social networking system. Such content items may include text, images, audio, and videos, for example.

In various embodiments, other users of the social networking system can access content items posted by the first user. In one example, the other users can access the content items by searching for the first user through the interface, for example, by user name. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that content items posted by the first user are no longer included in the content feed of the user. In some instances, the user may want to endorse, or "like", a content item. In such instances, the user can select an option provided in the interface to like the desired content item. The interaction module 108 can determine when a user likes a given content item and can store information describing this relationship. In some embodiments, information describing user interactions can be stored in a social graph as described in reference to FIG. 7. In some embodiments, the interaction module 108 can determine when a user shares a given content item and can store information describing the content item that was shared and with which users the content item was shared. In some instances, the user may want to post a comment in response to a content item. In such instances, the user can select an option provided in the interface to post a comment in response to the desired content item. The interaction module 108 can determine when a user posts comments for a given content item and can store information describing this relationship.

In addition to their respective content feeds, in some embodiments, users can also access various content channels. For example, as mentioned, the user can access personalized content channels, trending event channels, topic channels, and editorial channels. Naturally, these channel types are provided merely as examples and, depending on the implementation, other types of content channels can be made accessible including, for example, content channels that correspond to various entities or themes. In various embodiments, the content channel module 110 is configured to rank content items and/or content channels for users. More details regarding the content channel module 110 will be provided below with reference to FIG. 2.

Figure 2:
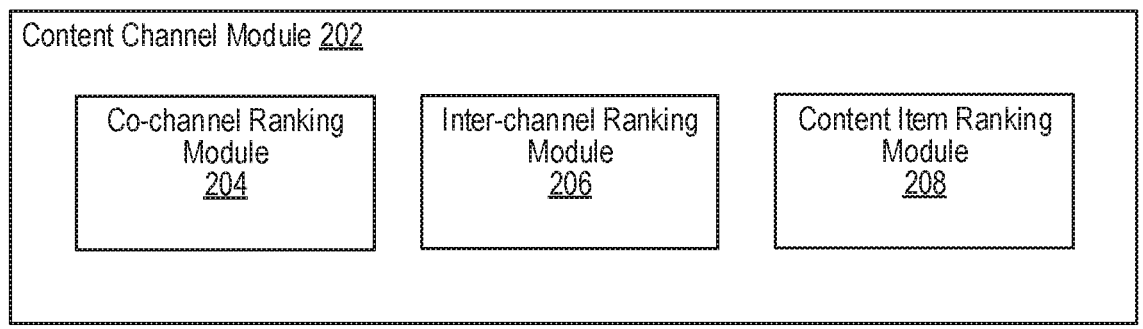
FIG. 2 illustrates an example content channel module, according to an embodiment of the present disclosure.

FIG. 2 illustrates a content channel module 202, according to an embodiment of the present disclosure. In some embodiments, the content channel module 110 of FIG. 1 can be implemented with the content channel module 202. As shown in the example of FIG. 2, the content channel module 202 can include a co-channel ranking module 204, an inter-channel ranking module 206, and a content item ranking module 208.

Figure 3A:
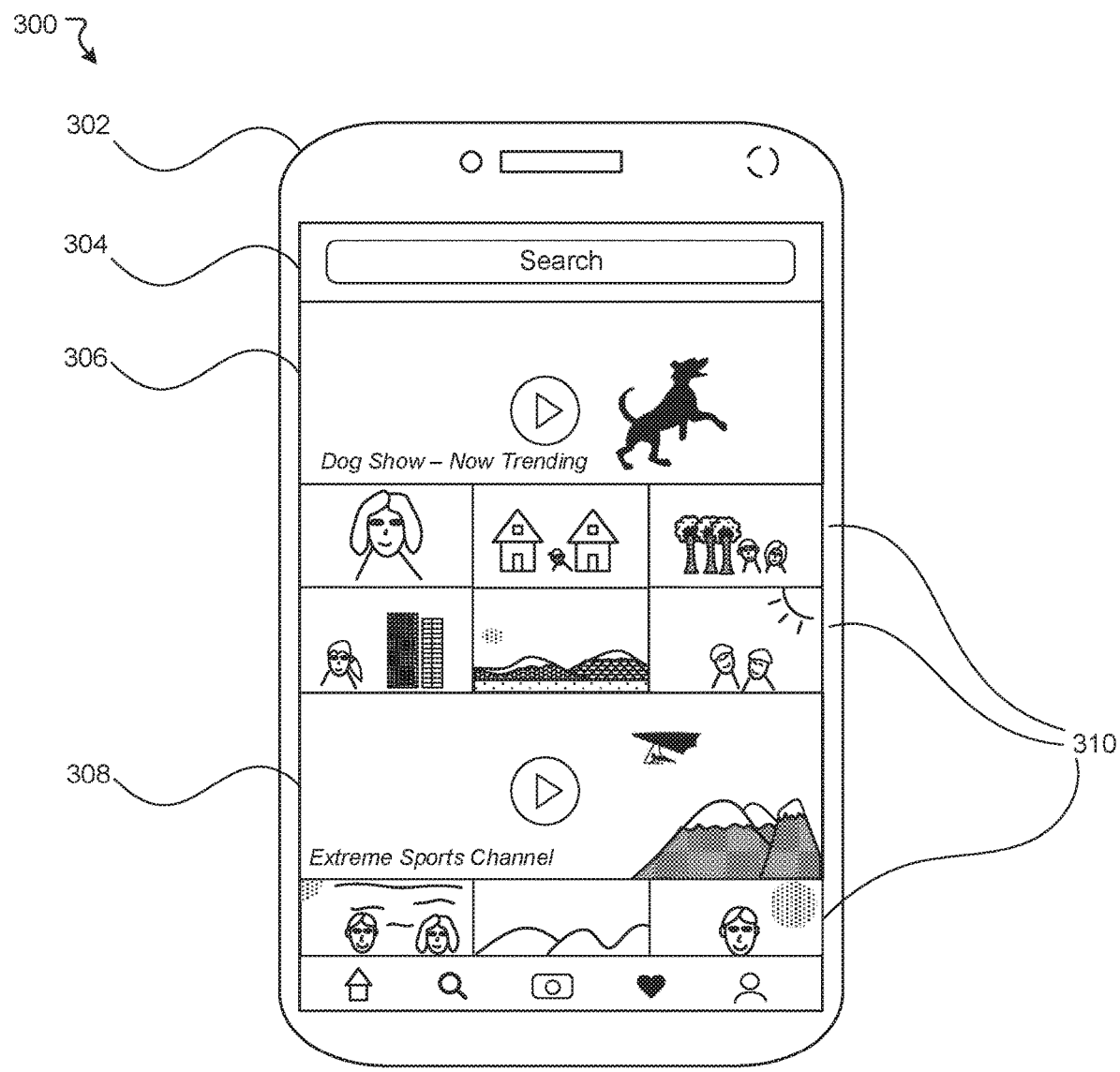
FIGS. 3A-B illustrate example interfaces, according to an embodiment of the present disclosure.
Figure 3B:
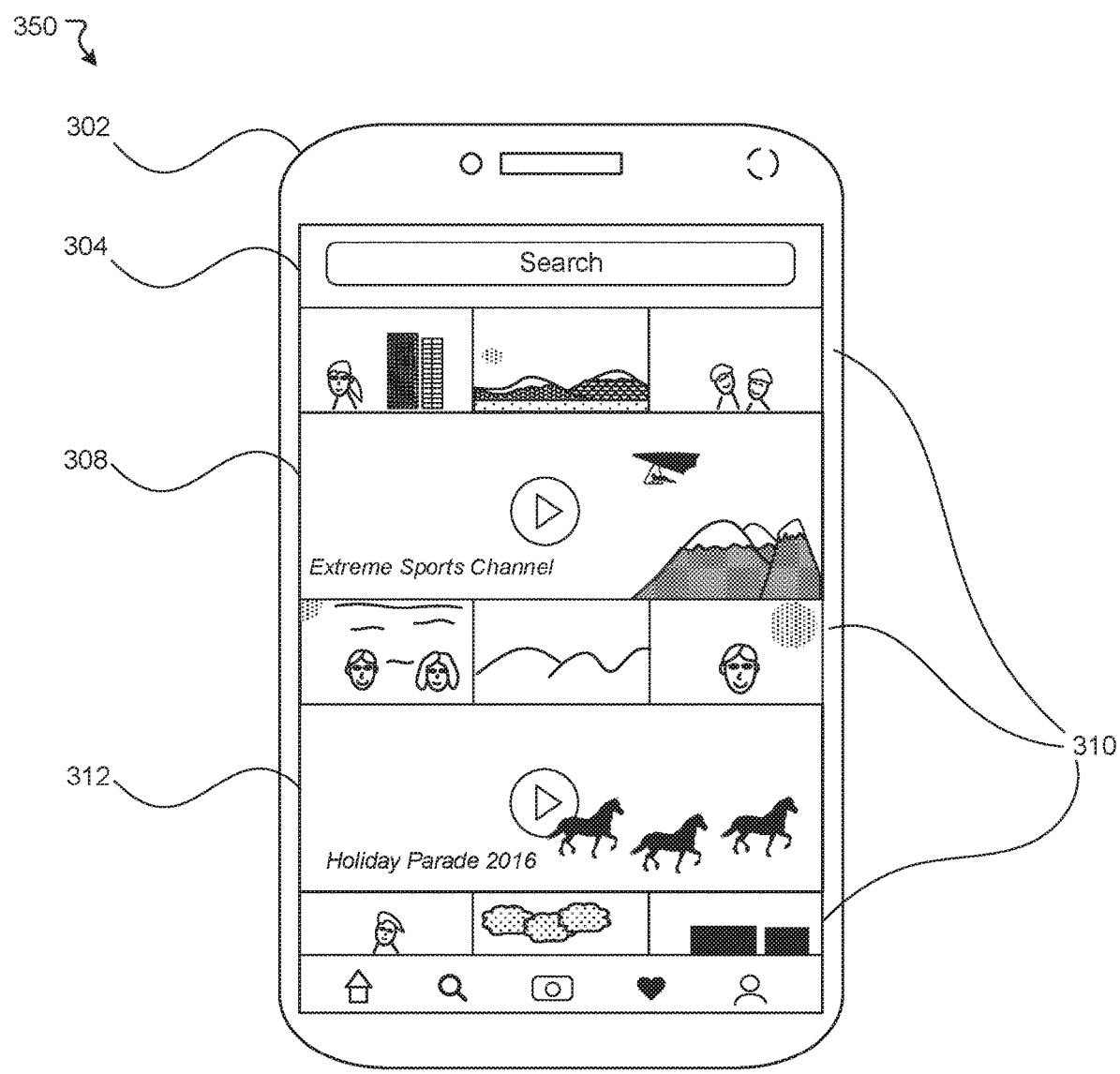

As mentioned, users of the social networking system can access various types of content channels (or streams). Some, or all, of these content channels can be presented to a user through an interface that is provided by a software application running on the user's computing device, as illustrated in the examples of FIGS. 3A-B. In some embodiments, the interface can include one or more slots through which content channels can be accessed.

In some embodiments, various content channels can be preassigned to the slots in the interface based on type. For example, in some embodiments, a first slot in the interface can be reserved for a personalized content channel, a second slot can be reserved for a trending event channel, a third slot can be reserved for a topic channel, and a fourth slot can be reserved for an editorial channel. In some embodiments, the order in which these content channels are presented can be modified by the co-channel ranking module 204. For example, in some embodiments, the co-channel ranking module 204 can present the topic channel in the first slot, the personalized content channel in the second slot, the editorial channel in the third slot, and the trending event channel in the fourth slot.

The co-channel ranking module 204 can determine the order in which the different content channels are slotted based on myriad considerations. In some embodiments, the ordering is based on the social networking activity of the user accessing the interface. For example, in some embodiments, the order in which the different types of content channels are slotted is based on the respective number of times each of the content channel types were accessed by the user over some period of time. In one example, if the user accessed one or more topic channels 60 times over some period of time and accessed one or more trending event channels 10 times over the same period of time, then topic channels are slotted in the interface before trending event channels. In some embodiments, the order in which the different types of content channels are slotted is based on the respective percentage of times each of the content channel types were accessed by the user over some period of time. In one example, if the user accessed one or more topic channels 70 percent of the time, one or more personalized content channels 20 percent of the time, one or more trending event channels 8 percent of the time, and one or more editorial channels 2 percent of the time, then a topic channel can be presented in the first slot in the interface, a personalized content channel in the second slot, a trending event channel in the third slot, and an editorial channel in the fourth slot. In some embodiments, a content channel is determined to be accessed by a user when the user selects (or clicks) the content channel, the user spends a threshold amount of time accessing the content channel, and/or based on a user impression, to name some examples.

In some embodiments, the ordering of content channel types is based on the collective activity of a group of users accessing the social networking system. The group of users may correspond to one or more demographics (e.g., age group, gender, shared interests, etc.) and/or a geographic region (e.g., zip code, city, state, country, continent, or any other boundary corresponding to a geographic region). In some embodiments, the order in which the different types of content channels are slotted is based on the respective number of times the content channel types were accessed by the group of users over some period of time. In some embodiments, the order in which the different types of content channels are slotted is based on the respective percentage of times the content channel types were accessed by the group of users over some period of time.

As mentioned, in some embodiments, various content channels can be preassigned to the one or more slots in the interface based on type. For example, a second slot in the interface may be reserved for presenting a trending event channel. In some instances, there may be many different content channels of a given type that are available for presentation in the designated slots. For example, both a first trending event channel and a second trending event channel may be available for presentation in the second slot in the interface. In some embodiments, the inter-channel ranking module 206 ranks content channels of a certain type amongst each other to determine which content channel to present in the designated slot. In the example above, the inter-channel ranking module 206 can rank both the first trending event channel and the second trending event channel and the best ranking channel can then be selected for presentation in the second slot of the interface. Content channels of the same type can be ranked amongst each other based on myriad considerations. For example, in some embodiments, a first content channel that is followed (or subscribed to) by the user is ranked higher than a second content channel that is not followed by the user. In some embodiments, a first content channel is ranked higher than a second content channel when more content items included in the first content channel were posted by entities that are being followed by the user. In some embodiments, a first content channel that is followed (or subscribed to) by at least one friend of the user (e.g., an entity being followed by the user) is ranked higher than a second content channel that is not followed by the friend. In some embodiments, a first content channel is ranked higher than a second content channel when more content items included in the first content channel were posted by entities that are being followed by at least one friend of the user.

In some embodiments, content channels can be ranked amongst each other based on the respective content items that are included in the content channels. For example, in some embodiments, a first content channel is ranked higher than a second content channel when a set of content items included in the first content channel received more interactions (e.g., likes, shares, and/or comments) from the user (or a group of users) than a set of content items included in the second content channel. In some embodiments, a first content channel is ranked higher than a second content channel when an amount of time spent by the user (or a group of users) viewing content items included in the first content channel is greater than an amount of time spent by the user (or the group of users) viewing content items included in the second content channel. In some embodiments, a first content channel is ranked higher than a second content channel when the media quality (e.g., video quality and/or sound quality) of content items included in the first content channel is greater than the quality of content items included in the second content channel.

In some embodiments, trending event channels can be ranked based in part on an additional set of considerations. For example, in some embodiments, if the user (or the computing device of the user) is located within a threshold geographic distance from a first event than a second event, then a trending event channel for the first event can be ranked higher than a trending event channel for the second event. In some embodiments, a trending event channel corresponding to an event that the user is attending is ranked higher than other trending event channels. In some embodiments, a trending event channel corresponding to an event that a friend of the user is attending is ranked higher than other trending event channels. In some embodiments, trending event channels may be associated with one or more categories (e.g., pop music, theatre, etc.). In such embodiments, a trending event channel that corresponds to one or more categories that are of interest to the user is ranked higher than other trending event channels. In some embodiments, trending event channels can be ranked based on their respective trend measurements. For example, in some embodiments, if a first trending event channel is trending at a higher rate than a second trending event channel, then the first trending event channel is ranked higher than the second trending event channel.

In some embodiments, topic channels may be ranked based in part on an additional set of considerations. For example, the user may specify one or more interests (e.g., bicycling, baking, etc.) through the social networking system in a profile associated with the user's account. In another example, the user may demonstrate various interests based in part on the types of content channels and/or content items that are accessed by the user over some period of time. In some embodiments, such user interests can be used to determine a ranking for a set of topic channels. For example, a first topic channel that corresponds to a topic in which the user has shown interest can be ranked higher than a second topic channel that corresponds to a topic in which the user has not shown interest. Naturally, the ranking of topic channels can change as the user's interests evolve over time.

In some embodiments, content channels are not preassigned to the one or more slots in the interface based on type. In such embodiments, all of the different types of content channels (e.g., personalized content channels, trending event channels, topic channels, editorial channels, etc.) are ranked amongst each other to determine a set of the best ranking content channels. The different types of content channels can be ranked using any of the approaches described above. The co-channel module 204 can then select content channels from the best ranking content channels to be presented in the slots. Thus, in such embodiments, the user may be presented a variable number of personalized content channels, trending event channels, topic channels, or editorial channels, depending on their respective rankings. For example, the interface may include five slots in which content channels can be presented. In this example, if the best ranking content channels include a first topic channel, a trending event channel, a personalized content channel, a second topic channel, and an editorial channel, then these five content channels can be presented in the interface based on their respective ranking. In another example, if the best ranking content channels include a first topic channel, a second topic channel, a third topic channel, a first trending event channel, and an editorial channel, then these five content channels can be presented in the interface based on their respective ranking.

The content item ranking module 208 can modify the presentation order for content items that are included in a content channel. In some embodiments, a content item can be ranked based on a number of likes received for the content item, a number of times the content item was shared with other users, a number of comments that were posted in response to the content item, a number of users following an entity that posted the content item, a number of users that accessed the content item, an average amount of time spent by users viewing the content item, whether the content item is trending in popularity among users, the video quality of the content item, the sound quality of the content item, and/or an amount of time since the content item was posted, to name some examples. The presentation order of the content channel in the content channel in relation to other content items in the content channel can be based on the rank determined for the content item.

FIGS. 3A-B illustrate example interfaces, according to embodiments of the present disclosure. FIG. 3A illustrates an example 300 of an interface 304, according to an embodiment of the present disclosure. In this example, the interface 304 is presented through a display screen of a computing device 302. Further, the interface 304 may be provided through an application (e.g., a web browser, a social networking application, messenger application, etc.) running on the computing device 302 that is configured to interact with a social networking system. The interface 304 includes a number of different options for accessing content through the social networking system. In some embodiments, the interface 304 can include a set of slots through which content channels of various types can be accessed. In this example, the interface 304 includes slots 306 and 308 through which respective content channels can be accessed. As mentioned, various types of content channels can be presented through the slots 306 and 308 including, for example, personalized content channels, trending event channels, topic channels, and editorial channels, to name some examples. The content channel presented in a given slot can be determined using the various approaches described above. In some embodiments, the user operating the computing device 302 can dismiss a content channel presented in a given slot to signal that the content channel is not of interest to the user. As a result, the dismissed content channel will not be presented to the user in the future. In some embodiments, a topic channel can be dismissed, for example, by selecting an option or performing an appropriate gesture through the computing device 302. The interface 304 can also include one or more content items that can be accessed through a grid 310 of content items. The grid 310 can include a number of different windows through which respective content items can be accessed. As shown, one or more slots 306 and 308 for accessing content channels can also be included amongst the grid 310. FIG. 3B illustrates another example 350 of the interface 304. In FIG. 3B, the user operating the computing device 302 has scrolled up to expose additional content. In response, another slot 312 is presented in the interface 304 through which a content channel can be accessed. The interface 304 is provided merely as an example and, naturally, many variations in the organization of content items and channels are possible. In some embodiments, upon selecting a content channel, the software application can be configured to provide an immersive interface that presents content items that are included in the content channel, as illustrated in the example of FIG. 4.

Figure 4:
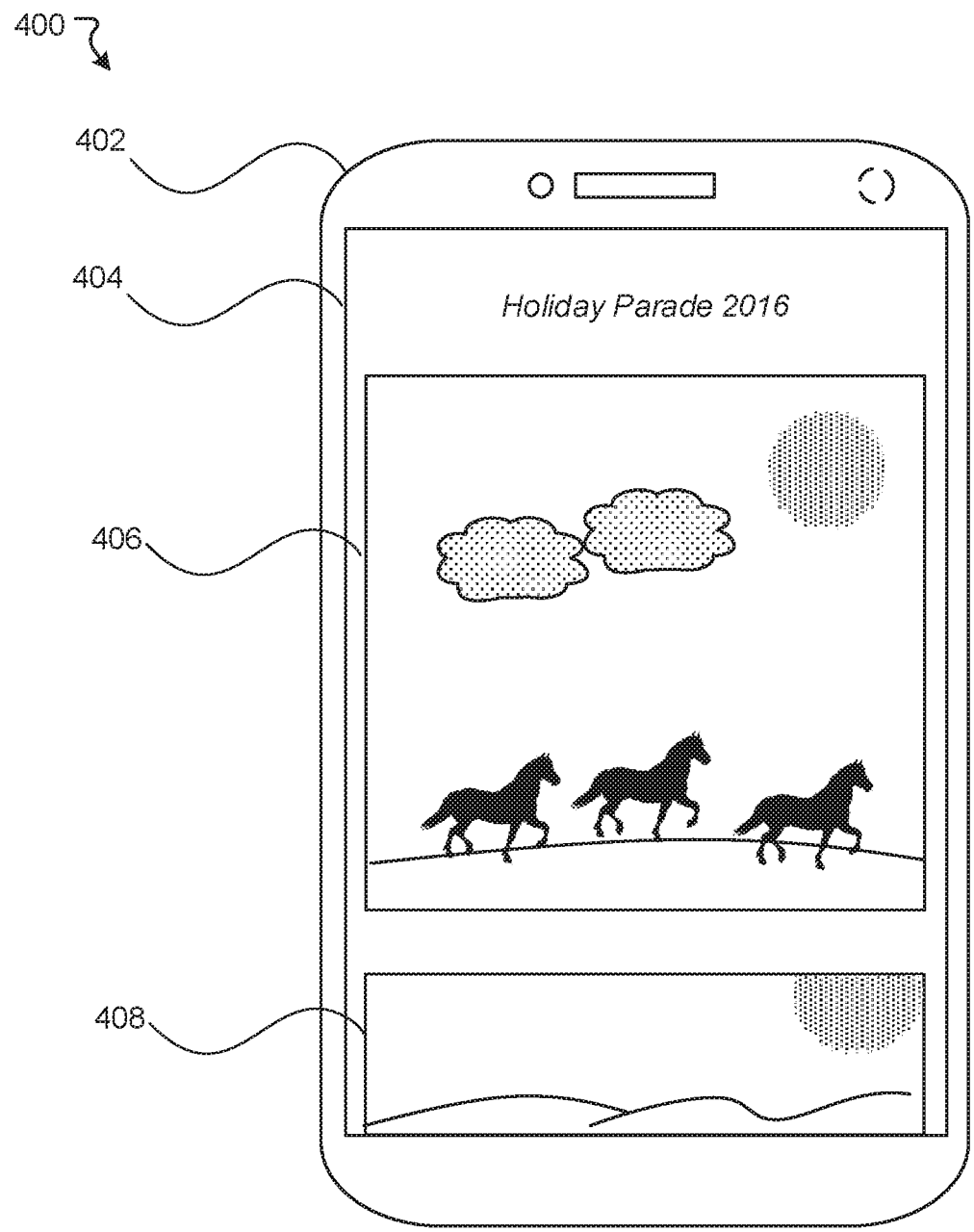
FIG. 4 illustrates another example interface, according to an embodiment of the present disclosure.

FIG. 4 illustrates an example 400 of an interface 404, according to an embodiment of the present disclosure. In this example, the interface 404 is presented through a display screen of a computing device 402. Further, the interface 404 may be provided through an application (e.g., a web browser, a social networking application, messenger application, etc.) running on the computing device 402 that is configured to interact with a social networking system. In this example, the interface 404 is an immersive interface that is being presented in response to a content channel (e.g., the content channel presented in slot 312 of FIG. 3B) being selected, as described in reference to FIGS. 3A-B. The interface 404 presents content items that correspond to the selected content channel. In this example, the interface 404 is presenting a content item 406. In some embodiments, the content items included in the content channel can individually be presented through the interface 404. In some embodiments, a portion of the next content item 408 to be presented is shown in the interface 404.

Figure 5:
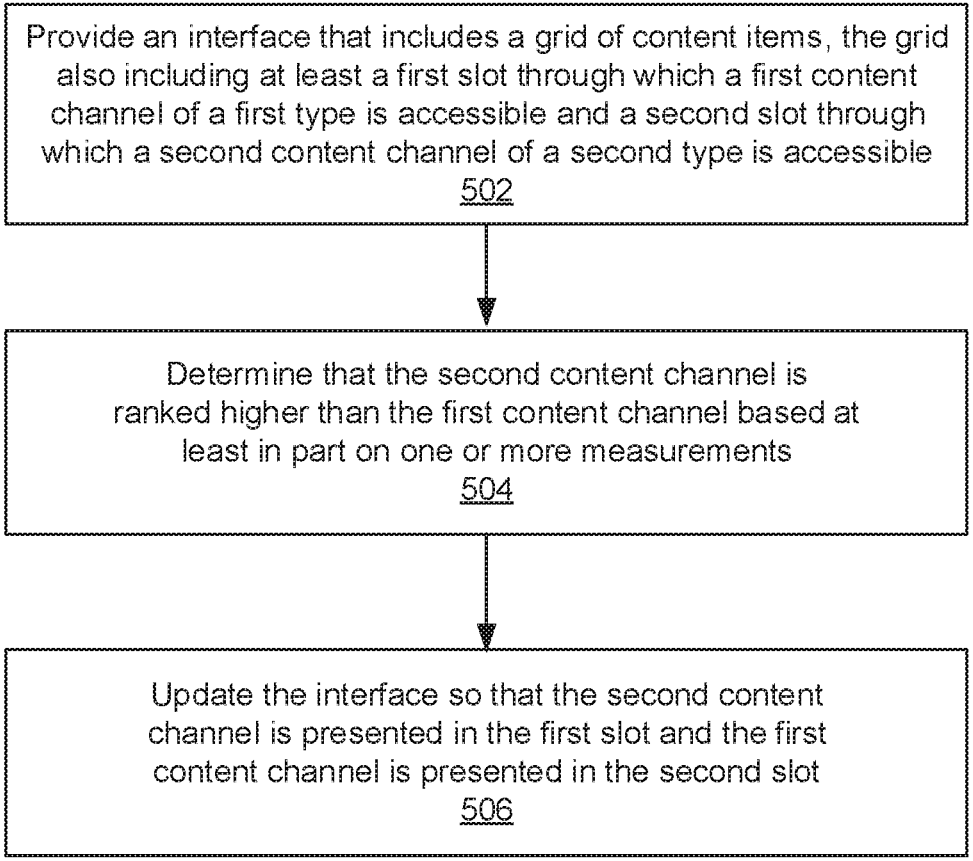
FIG. 5 illustrates an example method for co-channel ranking, according to an embodiment of the present disclosure

FIG. 5 illustrates an example method 500 for co-channel ranking, according to an embodiment of the present disclosure. It should be appreciated that there can be additional, fewer, or alternative steps performed in similar or alternative orders, or in parallel, within the scope of the various embodiments discussed herein unless otherwise stated.

At block 502, an interface that includes a grid of content items is provided, the grid also including at least a first slot through which a first content channel of a first type is accessible and a second slot through which a second content channel of a second type is accessible. At block 504, a determination is made that the second content channel is ranked higher than the first content channel based at least in part on one or more measurements. At block 506, the interface is updated so that the second content channel is presented in the first slot and the first content channel is presented in the second slot.

FIG. 6 illustrates an example method 600 for interchannel ranking, according to an embodiment of the present disclosure. It should be appreciated that there can be additional, fewer, or alternative steps performed in similar or alternative orders, or in parallel, within the scope of the various embodiments discussed herein unless otherwise stated.

At block 602, a determination is made that a set of content channels are available for presentation through a first slot in an interface. At block 604, a ranking for the set of content channels is determined. At block 606, a best ranking content channel is selected from among the set of content channels. At block 608, the interface that includes a grid of content items is provided. The grid also includes at least the first slot through which the best ranking content channel is accessible.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
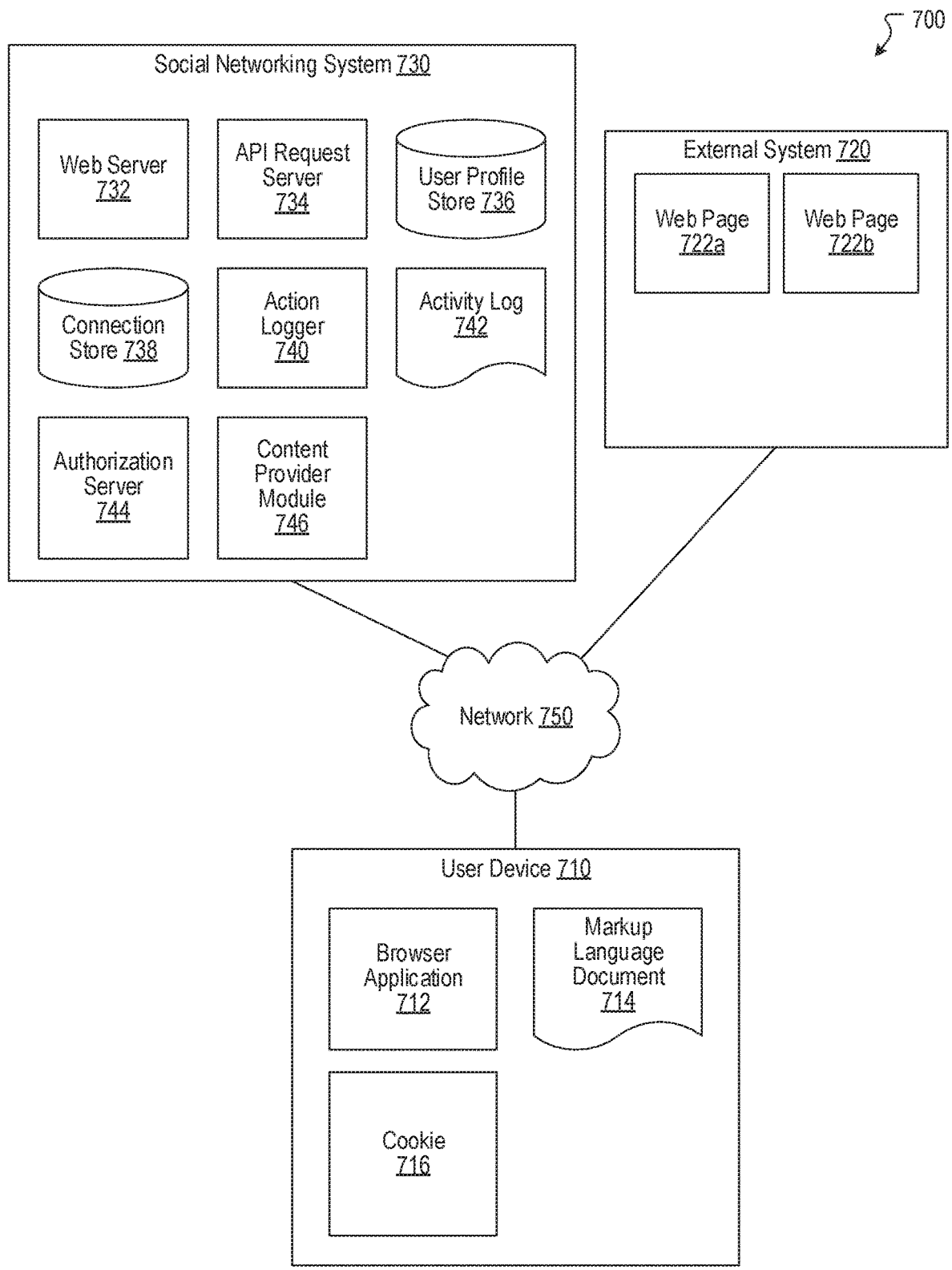
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content provider module 746. The content provider module 746 can, for example, be implemented as the content provider module 102 of FIG. 1. In some embodiments, the content provider module 746, in whole or in part, may be implemented in a user device 710 or the external system 720. As discussed previously, it should be appreciated that there can be many variations or other possibilities.

Hardware Implementation

Figure 8:
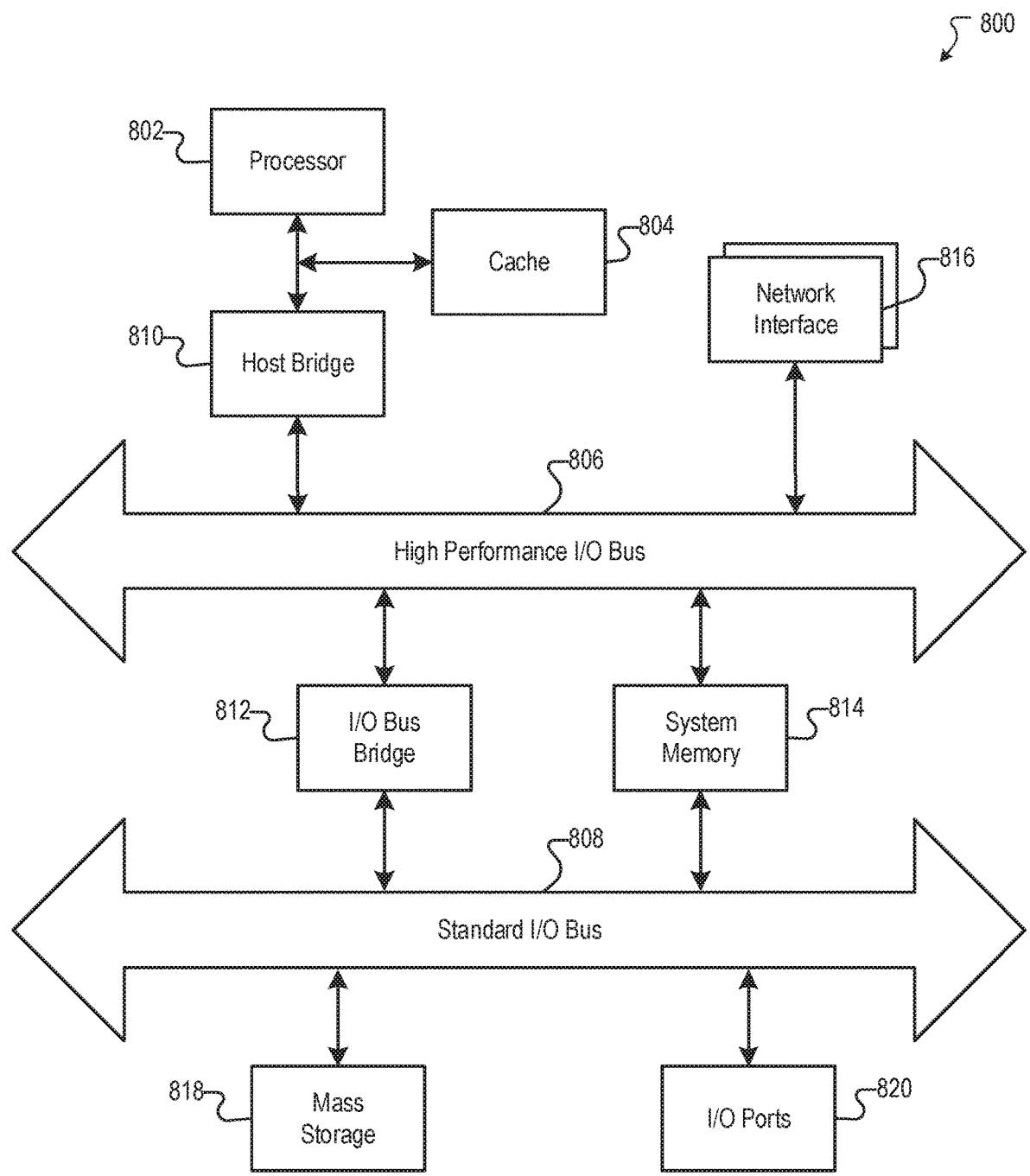
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, that a set of content channels are available for presentation through a first slot in an interface;
   determining, by the computing system, a ranking for the set of content channels;
   selecting, by the computing system, a best ranking content channel from among the set of content channels;
   providing, by the computing system, the interface that includes a grid of content items, the grid also including at least the first slot through which the best ranking content channel is accessible, wherein the interface includes an option to dismiss the best ranking content channel, and wherein dismissal of the best ranking content channel removes the best ranking content channel from the set of content channels that are available for presentation;
   determining, by the computing system, a selection of the option to dismiss the best ranking content channel, wherein selection of the option provides an indication that the best ranking content channel is not of interest, wherein the dismissal removes the best ranking content channel from the set of content channels;
   selecting, by the computing system, a next best ranking content channel from among the set of content channels; and
   providing, by the computing system, access to the next best ranking content channel through the first slot in the interface.

2. The computer-implemented method of claim 1, wherein determining a ranking for the set of content channels further comprises:
   determining, by the computing system, that more content items included in a second content channel were posted by entities being followed by a user accessing the interface than in a first content channel; and
   determining, by the computing system, that the second content channel is ranked higher than the first content channel.

3. The computer-implemented method of claim 1, wherein determining a ranking for the set of content channels further comprises:
   determining, by the computing system, that more content items included in a second content channel were posted by entities being followed by at least one friend of a user accessing the interface than in a first content channel; and
   determining, by the computing system, that the second content channel is ranked higher than the first content channel.

4. The computer-implemented method of claim 1, wherein determining a ranking for the set of content channels further comprises:
   determining, by the computing system, that more content items included in a second content channel satisfy a threshold media quality than content items included in a first content channel; and
   determining, by the computing system, that the second content channel is ranked higher than the first content channel.

5. The computer-implemented method of claim 4, wherein the media quality is measured based at least in part on a video quality, an audio quality, or both.

6. The computer-implemented method of claim 1, wherein determining a ranking for the set of content channels further comprises:
   determining, by the computing system, that a first content channel corresponds to a first event and a second content channel corresponds to a second event;
   determining, by the computing system, that a user accessing the interface is located within a threshold geographic distance from the second event and not from the first event; and
   determining, by the computing system, that the second content channel is ranked higher than the first content channel.

7. The computer-implemented method of claim 1, wherein determining a ranking for the set of content channels further comprises:
   determining, by the computing system, that a first content channel corresponds to a first event and a second content channel corresponds to a second event;
   determining, by the computing system, that a friend of a user accessing the interface is attending the second event; and
   determining, by the computing system, that the second content channel is ranked higher than the first content channel.

8. The computer-implemented method of claim 1, wherein determining a ranking for the set of content channels further comprises:
    determining, by the computing system, that more user interactions were received for content items included in a second content channel than for content items included in a first content channel; and
    determining, by the computing system, that the second content channel is ranked higher than the first content channel.

9. The computer-implemented method of claim 8, wherein a user interaction is determined based on a user liking a content item, sharing the content item, or posting a comment in response to the content item.

10. The computer-implemented method of claim 1, wherein determining a ranking for the set of content channels further comprises:
    determining, by the computing system, that an amount of time spent by users viewing content items included in a second content channel is greater than an amount of time spent by users viewing content items included in a first content channel; and
    determining, by the computing system, that the second content channel is ranked higher than the first content channel.

11. A system comprising:
    at least one processor; and
    a memory storing instructions that, when executed by the at least one processor, cause the system to perform:
        determining that a set of content channels are available for presentation through a first slot in an interface;
        determining a ranking for the set of content channels;
        selecting a best ranking content channel from among the set of content channels;
        providing the interface that includes a grid of content items, the grid also including at least the first slot through which the best ranking content channel is accessible, wherein the interface includes an option to dismiss the best ranking content channel, and wherein dismissal of the best ranking content channel removes the best ranking content channel from the set of content channels that are available for presentation;
        determining a selection of the option to dismiss the best ranking content channel wherein selection of the option provides an indication that the best ranking content channel is not of interest, wherein the dismissal removes the best ranking content channel from the set of content channels;
        selecting a next best ranking content channel from among the set of content channels; and
        providing access to the next best ranking content channel through the first slot in the interface.

12. The system of claim 11, wherein determining a ranking for the set of content channels further causes the system to perform:
    determining that more content items included in a second content channel were posted by entities being followed by a user accessing the interface than in a first content channel; and
    determining that the second content channel is ranked higher than the first content channel.

13. The system of claim 11, wherein determining a ranking for the set of content channels further causes the system to perform:
    determining that more content items included in a second content channel were posted by entities being followed by at least one friend of a user accessing the interface than in a first content channel; and
    determining that the second content channel is ranked higher than the first content channel.

14. The system of claim 11, wherein determining a ranking for the set of content channels further causes the system to perform:
    determining that more content items included in a second content channel satisfy a threshold media quality than content items included in a first content channel; and
    determining that the second content channel is ranked higher than the first content channel.

15. The system of claim 14, wherein the media quality is measured based at least in part on a video quality, an audio quality, or both.

16. A non-transitory computer-readable storage medium including instructions that, when executed by at least one processor of a computing system, cause the computing system to perform a method comprising:
    determining that a set of content channels are available for presentation through a first slot in an interface;
    determining a ranking for the set of content channels;
    selecting a best ranking content channel from among the set of content channels; and
    providing the interface that includes a grid of content items, the grid also including at least the first slot through which the best ranking content channel is accessible, wherein the interface includes an option to dismiss the best ranking content channel, and wherein dismissal of the best ranking content channel removes the best ranking content channel from the set of content channels that are available for presentation;
    determining a selection of the option to dismiss the best ranking content channel, wherein selection of the option provides an indication that the best ranking content channel is not of interest, wherein the dismissal removes the best ranking content channel from the set of content channels;
    selecting a next best ranking content channel from among the set of content channels; and
    providing access to the next best ranking content channel through the first slot in the interface.

17. The non-transitory computer-readable storage medium of claim 16, wherein determining a ranking for the set of content channels further causes the system to perform:
    determining that more content items included in a second content channel were posted by entities being followed by a user accessing the interface than in a first content channel; and
    determining that the second content channel is ranked higher than the first content channel.

18. The non-transitory computer-readable storage medium of claim 16, wherein determining a ranking for the set of content channels further causes the system to perform:
    determining that more content items included in a second content channel were posted by entities being followed by at least one friend of a user accessing the interface than in a first content channel; and
    determining that the second content channel is ranked higher than the first content channel.

19. The non-transitory computer-readable storage medium of claim 16, wherein determining a ranking for the set of content channels further causes the system to perform:
    determining that more content items included in a second content channel satisfy a threshold media quality than content items included in a first content channel; and determining that the second content channel is ranked higher than the first content channel.

20. The non-transitory computer-readable storage medium of claim 19, wherein the media quality is measured based at least in part on a video quality, an audio quality, or both.

\* \* \* \* \*